Figure 1:
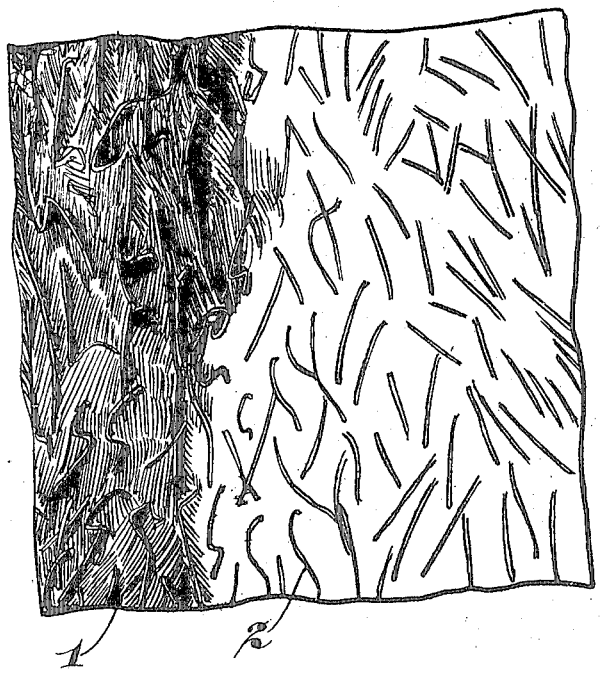

G. W. W. HARDEN.
INSULATING MATERIAL AND PROCESS FOR PRODUCING THE SAME.
APPLICATION FILED NOV. 15, 1913.

1,198,028.

Patented Sept. 12, 1916.

Witnesses
E. C. Skinkle
A. H. Opsahl.

Inventor
George W. W. Harden
By his Attorneys
Williamson Merchant

UNITED STATES PATENT OFFICE.

GEORGE W. W. HARDEN, OF LE ROY, MINNESOTA.

INSULATING MATERIAL AND PROCESS FOR PRODUCING THE SAME.

1,198,028.    Specification of Letters Patent.    Patented Sept. 12, 1916.

Application filed November 15, 1913. Serial No. 801,213.

*To all whom it may concern:*

Be it known that I, GEORGE W. W. HARDEN, a citizen of the United States, residing at Le Roy, in the county of Mower and State of Minnesota, have invented certain new and useful Improvements in Insulating Material and Processes of Producing the Same; and I do hereby declare the following to be a full, clear, and exact description of the invention, such as will enable others skilled in the art to which it appertains to make and use the same.

My present invention has for its object to provide a fibrous board or sheet which may be made at small cost and which has high capacity for insulating heat and cold and for deadening sound.

The invention resides both in the product and in the process of producing the same.

Paper pulp, or old paper brought to a pulpy condition, has certain qualities which are ideal for heat and cold insulating material, and many efforts have been made to utilize old or waste paper for that purpose. All efforts in this direction, however, have failed because of the impossibility of making a sufficiently strong or self-sustaining and highly porous body or sheet from such pulpy mass. It has been found that if such pulpy mass was made into a sheet and the water pressed out, as in the process of paper making, the product would be a hard board with few air cells and low insulating efficiency, and if the water was removed from the sheet by the slow process of evaporation, instead of pressure, the product would be much more porous, and hence, a better insulating material, but would be so brittle and crumbly that it would have little or no commercial value. It is also found that if raw flax straw, for example, were added to the pulp, and the whole reduced to a pulpy condition, practically the same bad results would follow.

By the use of unground stems of raw whole straw of considerable length, I overcome the tendency of the pulp to shrink and dry in a hard non-porous condition, and at the same time, obtain a highly efficient reinforcement to the pulp. Furthermore, I have discovered that if pulp is intermixed with the long unground stems of whole raw straw, such straw will open up and loosen the pulp after the pressure required to remove the water necessarily used in forming the sheet, has been removed therefrom, thus giving the insulating sheet a porous character highly desirable for insulating purposes.

Partly pulped waste paper is a very cheap source of low grade pulp, and this is preferably commingled in water with the straw just as it comes from the threshing machine.

I first take old newspapers or other waste paper and bring the same to a semi-pulpy condition, by rubbing or beating the paper in water. I then take the whole raw straw, preferably a flax straw, on account of its great strength, and mix it with the partly pulped paper, by stirring or beating the same in water. By this treatment, the raw straw will be intertangled, and the pulp will be thoroughly commingled therewith, and moreover, will adhere to all particles of the straw. After being thoroughly mixed, the resultant commingled mass is molded or formed into sheets of the desired thickness and is pressed and dried. When thus pressed and dried, the pulp paper will form an efficient binder for the raw straw and the raw straw will afford a strong but flexible reinforcement to the pulp. In this way, the good qualities both of the pulp and of the raw straw are utilized and are made, the one to reinforce the other. Furthermore, both the raw straw and the waste paper pulp are very cheap materials, and in fact, are the cheapest materials, and at the same time, the best materials that can be utilized for this purpose. The sheet thus formed is very porous and has a high heat insulating quality, and furthermore, is flexible, coherent and strong.

In practice, I have obtained highly satisfactory results by the use of about one-half pulp and one-half raw straw, but these proportions may, of course, be varied. Incidentally, the raw straw will be more or less broken in the process of commingling the same with the pulp, but all of the particles of the whole raw straw remain in the completed product, except possibly minute particles which incidentally may be washed away, by the water. However, no attempt is made to carry away even these minute particles of the raw straw, and the particles washed away are so unconsequential that such action may be entirely disregarded.

The long unground stems of the whole raw straw are required, both for the purpose of giving porosity to the sheet and for giving the same the desired self-sustaining and flexible character. The longer the stems of the whole straw, the better, and they must always be of considerable length, because if ground or even cut up into very short lengths, they would not give the desired reinforcement nor the desired porosity.

The improved product is illustrated in the accompanying drawings wherein—

Figure 2:
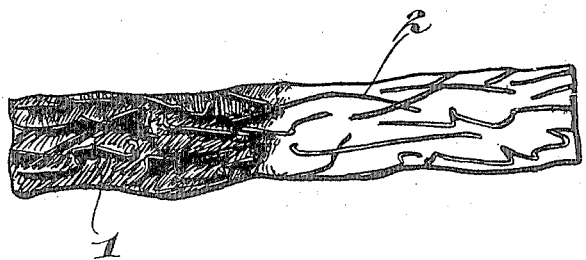

Figure 1 is a plan view showing a sheet or portion of a sheet of the improved material; and Fig. 2 is an edge elevation of the same.

In these drawings, the pulp is indicated by the numeral 1 and the straw by the numeral 2.

What I claim is:

1. An insulating sheet made of low grade. paper pulp and unground stems of raw whole straw, commingled and felted together, with the pulp serving as a binder to the straw and the straw serving as a reinforcement to the pulp and forming air cells in the sheet.

2. An insulating sheet made up of waste paper pulped at least in part, and long unground stems of raw whole straw intermingled and felted together, with the pulp serving as a binder to the straw and the straw serving as a reinforcement to the pulp and forming air cells in the sheet.

3. The process of making insulating sheets which consists first, in making low grade pulp, second, in commingling therewith, unground stems of whole raw straw in water, and third, in forming the commingled materials into a sheet and drying the same.

4. The process of making insulating sheets which consists, first in reducing waste paper at least to a partly pulped condition, second, in commingling the same with long unground stems of raw whole straw in water, and third, in forming the said commingled materials into a sheet and drying the same.

In testimony whereof I affix my signature in presence of two witnesses.

GEORGE W. W. HARDEN.

Witnesses:
BERNICE G. WHEELER,
HARRY D. KILGORE.